United States Patent
Lee

(10) Patent No.: US 8,546,973 B2
(45) Date of Patent: Oct. 1, 2013

(54) MILD HYBRID SYSTEM AND METHOD FOR CONTROLLING THE SAME

(75) Inventor: Jun Yong Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 486 days.

(21) Appl. No.: 12/784,839

(22) Filed: May 21, 2010

(65) Prior Publication Data

US 2011/0115288 A1    May 19, 2011

(30) Foreign Application Priority Data

Nov. 17, 2009   (KR) .................. 10-2009-0111173

(51) Int. Cl.
*B60L 3/00*   (2006.01)
*H02J 7/00*   (2006.01)

(52) U.S. Cl.
USPC ........... 307/10.1; 307/125; 307/126; 307/130

(58) Field of Classification Search
USPC ................................. 307/10.1, 130, 126, 125
See application file for complete search history.

(56) References Cited

U.S. PATENT DOCUMENTS

| 6,919,648 | B2 * | 7/2005 | Bolz et al. ............... 290/40 C |
| 7,902,692 | B2 * | 3/2011 | Darroman et al. ......... 307/10.1 |

FOREIGN PATENT DOCUMENTS

| JP | 11-122824 A | 4/1999 |
| JP | 11-341607 A | 12/1999 |
| JP | 2004-207108 A | 7/2004 |
| JP | 2009-029395 A | 2/2009 |
| KR | 10-2004-0074783 | 8/2004 |

* cited by examiner

*Primary Examiner* — Rexford Barnie
*Assistant Examiner* — Dru Parries
(74) *Attorney, Agent, or Firm* — Edwards Wildman Palmer LLP; Peter F. Corless; Stephen D. LeBarron

(57) ABSTRACT

A mild hybrid system according embodiments of the invention may include: a motor-alternator; an inverter for controlling electrical energy flow to and from the motor-alternator; an electrical energy storage for storing electrical energy generated by the motor-alternator; and a unidirectional DC/DC buck converter including a bypass means for providing a physical connection between the motor-alternator and a vehicle electrical load. With the system, the manufacturing cost can be reduced, packaging process can be simplified, and an additional cooling device is not required.

1 Claim, 8 Drawing Sheets

MILD HYBRID SYSTEM AND METHOD FOR CONTROLLING THE SAME

CROSS-REFERENCE TO RELATED APPLICATION

This application claims under 35 U.S.C. §119(a) the benefit of Korean Patent Application No. 10-2009-111173 filed Nov. 17, 2009, the entire contents of which are incorporated herein by reference.

BACKGROUND (a) Technical Field

The present disclosure relates to a mild hybrid system and a method for controlling the same, which can improvement fuel efficiency.

(b) Background Art

Demands for environment-friendly vehicles has been increased One of the attempts to meet the demands is to provide a mild hybrid system. In general, the mild hybrid system includes an engine and a motor-alternator connected to the engine. The motor-alternator, as a starter motor, receives drive power through an inverter to assist the power of the engine. On the other hand, the motor-alternator, as a generator, generates electricity using energy generated during braking to supply the electricity to a vehicle electrical load.

FIG. 1 is a schematic diagram showing an existing mild hybrid system, and FIGS. 2 and 3 are schematic diagrams showing power transmission paths of the mild hybrid system.

As shown in FIG. 1, the existing mild hybrid system includes a motor-alternator 1, an inverter 7 for controlling the motor-alternator 1, a supercapacitor 2 as an electrical energy storage, and a DC/DC converter 3 for connecting a high voltage of about 30 V and a vehicle electrical load 5 (about 14 V).

Typically, the mild hybrid system has an Idle Stop & Go (hereinafter referred to as "ISG") function to allow the engine automatically to be turned off when the vehicle stops for a long time and to be turned on when the vehicle is then started. During idle stop, as shown in FIG. 2(a), when the charge voltage of the supercapacitor 2 is greater than the vehicle electrical load 5, the voltage charged in the supercapacitor 2 is supplied to the vehicle electrical load 5 through the DC/DC converter 3. Meanwhile, as shown in FIG. 2(b), when the voltage of the supercapacitor 2 is smaller than a reference voltage (required to drive the vehicle electrical load 5), it is impossible to transmit the electrical energy from the supercapacitor 2 to the vehicle electrical load 5 because the DC/DC converter operates as a buck converter, and thus the electricity of a battery 4 is supplied to the vehicle electrical load 5.

Moreover, as shown in FIG. 3(a), during vehicle braking, the motor-alternator 1 converts the rotational kinetic energy of the wheels into electrical energy and stores the electrical energy in the supercapacitor 2, and the electrical energy stored in the supercapacitor 2 is supplied to the vehicle electrical load 5 during the normal operation of the vehicle such as during cruise or acceleration, which leads to a reduction in the generation load of the motor-alternator 1, thereby improving the fuel efficiency. Further, as shown in FIG. 3(b), during vehicle acceleration, the supercapacitor 2 operates the motor-alternator 1 with the electrical energy recovered during regenerative braking to assist the engine torque, which results in improvement in fuel efficiency, and supplies the reference voltage to the vehicle electrical load 5 to be operated.

However, the existing mild hybrid system has the drawback that the amount of electrical energy recovered during regenerative braking is limited since the capacity of the motor-alternator 1 is small. Therefore, when the vehicle electrical load such as an air conditioner, blower, wiper, audio, etc. is increased above a certain level, it is impossible to cope with the electrical load generated during the running of the vehicle with the electrical energy recovered during regenerative braking, which leads to a reduction in fuel efficiency. More particularly, as shown in FIG. 4, which shows the change of improvement in fuel efficiency according to the electrical load in the existing mild hybrid system, when the vehicle electrical load is increased, the improvement in fuel efficiency obtained by a reduction in the generation load of the motor-alternator 1 is sharply reduced. Moreover, the DC/DC converter 3 should be designed to provide a high capacity (more than 1.5 kW) so as to cope with the capacity of the entire electrical load, which leads to an increase in the cost and an inefficiency of the system.

In addition, the existing mild hybrid system starts the vehicle using the electrical energy stored in the supercapacitor 2. However, since the level of electrical energy stored in the supercapacitor 2 is continuously reduced by self-discharge in terms of the characteristics of the supercapacitor 2, the level of electrical energy is reduced to a level at which the vehicle cannot be started when it is left for a long time. As a result, the vehicle should be started either by using the existing starter system or by operating the DC/DC converter 3 in a reverse direction to charge the supercapacitor 2 with the electrical energy of the 12 V battery 4. Namely, the existing mild hybrid system has the drawback that the DC/DC converter 3 should be configured as bidirectional or the existing starter system cannot be eliminated.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides a mild hybrid system and a method for controlling the same, in which a unidirectional DC/DC buck converter having a bypass function is configured to provide a bidirectional flow of electricity in a bypass state.

In one aspect, the present invention provides a mild hybrid system. The mild hybrid system includes a motor-alternator, an inverter, an electrical energy storage, and a unidirectional DC/DC buck converter. The inverter controls electrical energy flow to and from the motor-alternator. The electrical energy storage stores electrical energy generated by the motor-alternator. The unidirectional DC/DC buck converter includes a bypass means for providing a physical connection between the motor-alternator and a vehicle electrical load.

In another aspect, the present invention provides a method for controlling a mild hybrid system. According to the method, it is determined whether a current electrical load is greater than a reference electrical load. If it is determined that the current electrical load is greater than the reference electrical load, it is determined whether a unidirectional DC/DC buck converter is in a bypass state. If it is determined that the unidirectional DC/DC buck converter is not in the bypass state; an electrical energy storage is disconnected from a motor-alternator. The generation voltage of the motor-alternator is reduced to a voltage level of the reference electrical load when the electrical energy storage is disconnected from the motor-alternator. The unidirectional DC/DC buck converter performs bypass function when the voltage level of the motor-alternator is equal to the voltage level of the reference electrical load.

The above and other aspects of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not imitative of the present invention, and wherein.

Figure 1:
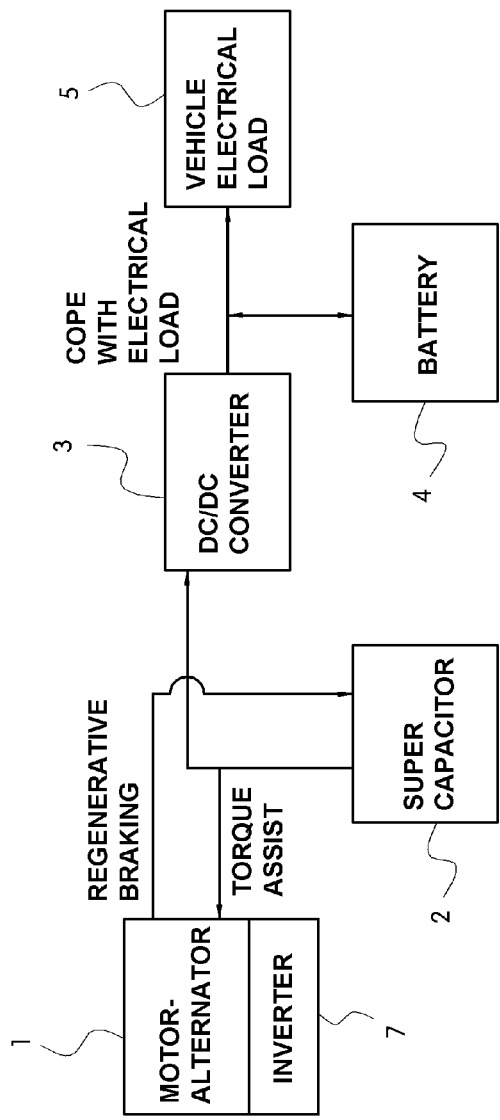
FIG. 1 is a schematic diagram showing an existing mild hybrid system.
Figure 2:
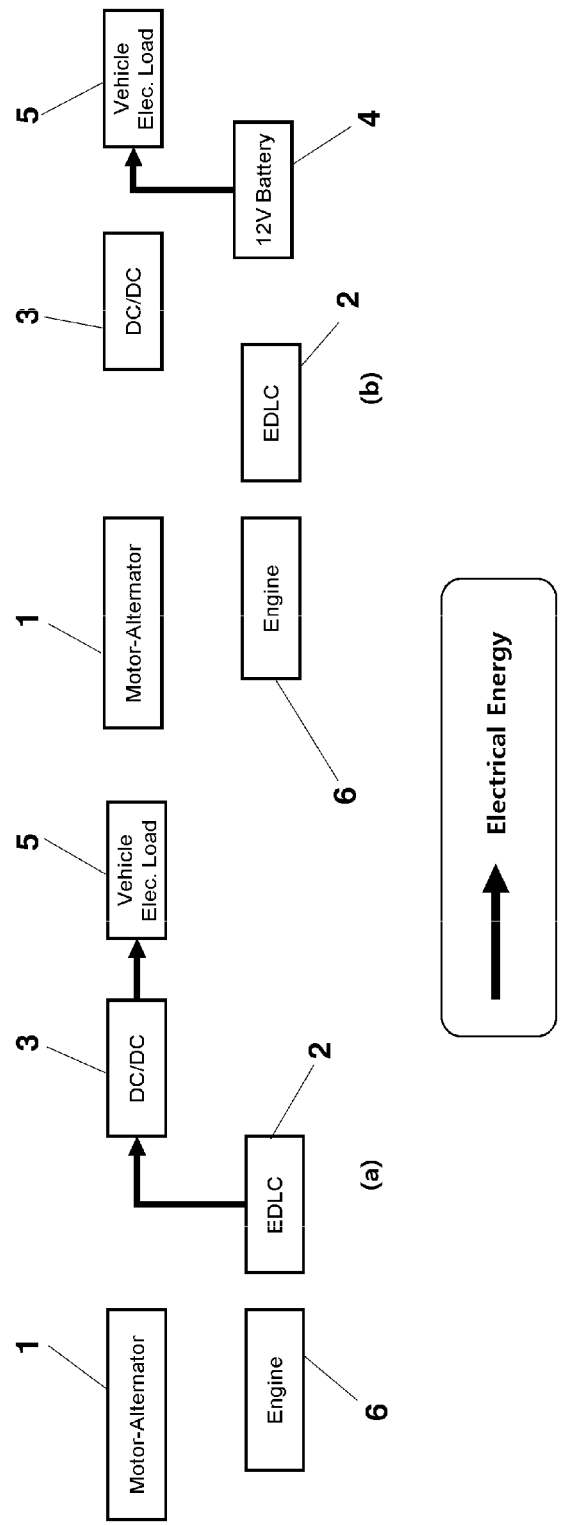
FIGS. 2 and 3 are schematic diagrams showing power transmission paths during the operation of the mild hybrid.
Figure 3:
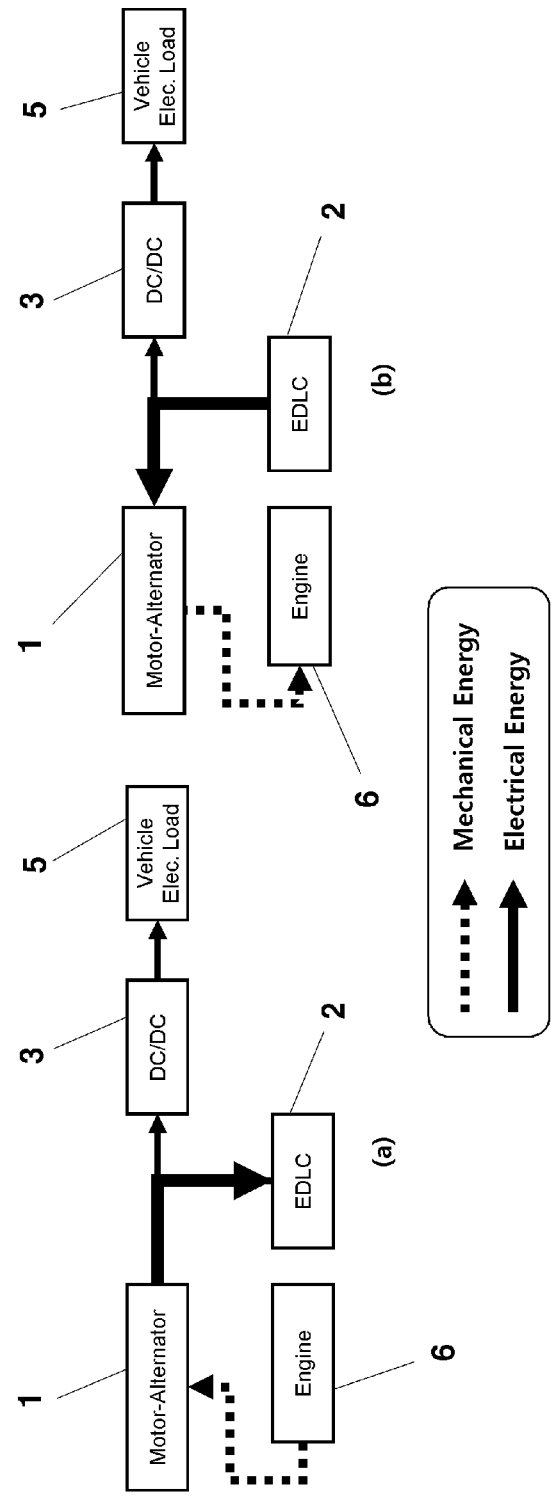
Figure 4:
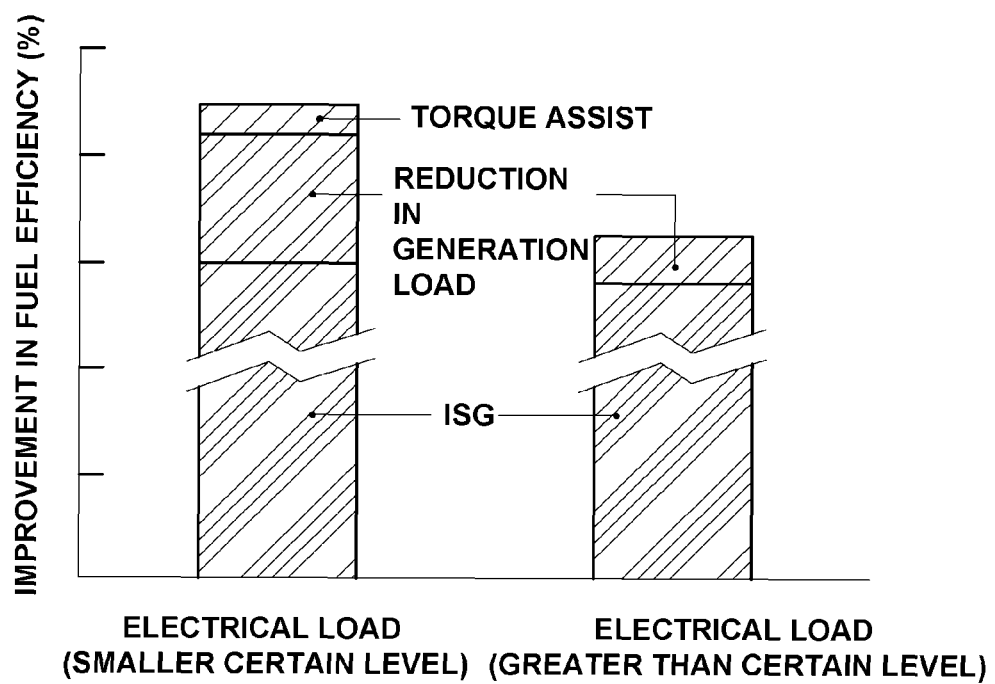
FIG. 4 is a graph showing the change of improvement in fuel efficiency according to an electrical load in the existing mild hybrid system.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 5:
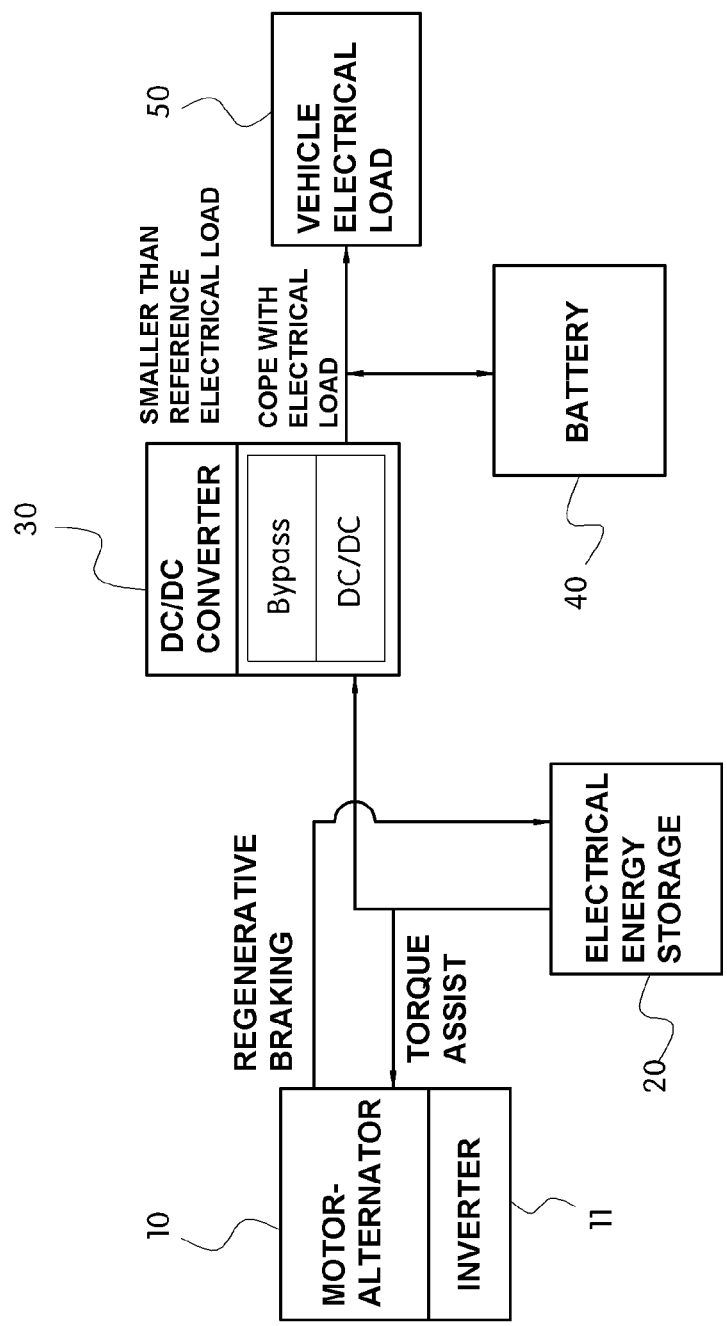
FIGS. 5 and 6 are schematic diagrams showing a mild hybrid system in accordance with an exemplary embodiment of the present invention.
Figure 6:
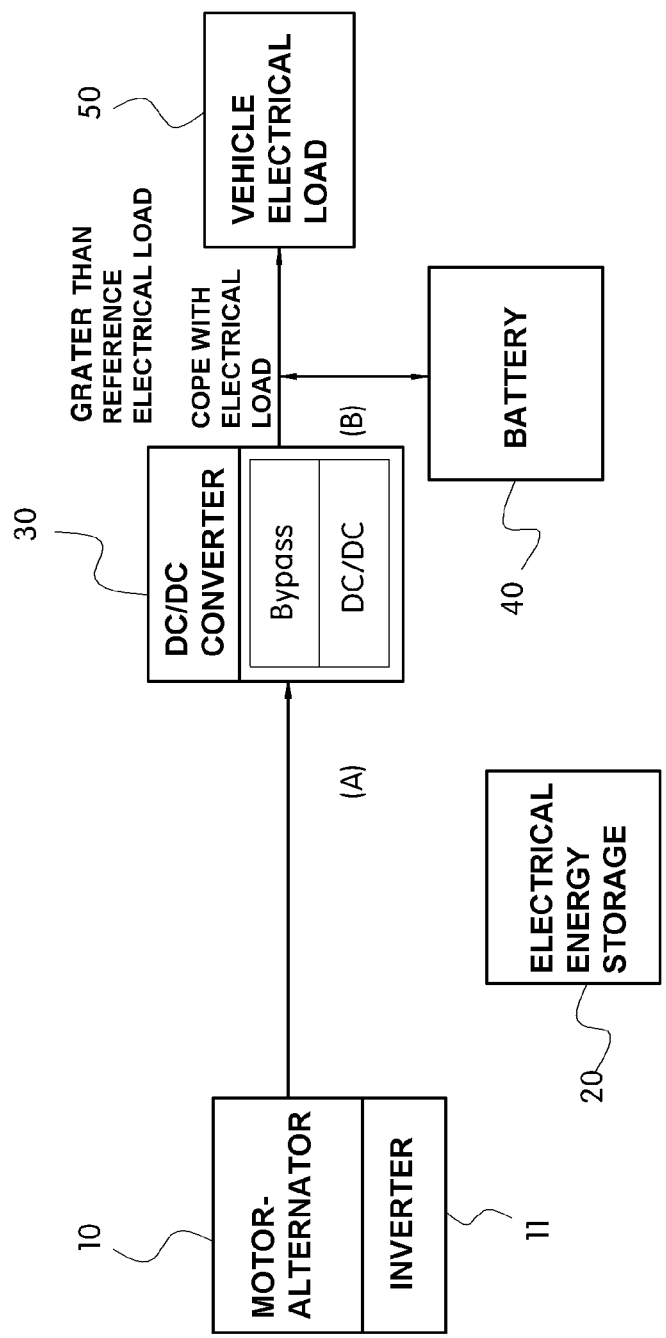

FIGS. 5 and 6 are schematic diagrams showing a mild hybrid system in accordance with an exemplary embodiment of the present invention, in which FIG. 5 shows a power transmission path when the electrical load used in the entire electrical load of a hybrid vehicle is smaller than a reference electrical load and FIG. 6 shows a power transmission path when the electrical load used in the entire electrical load of the hybrid vehicle is greater than the reference electrical load.

As shown in the figures, the mild hybrid system in accordance with the present invention includes a motor-alternator 10, an inverter 11, an electrical energy storage 20, and a unidirectional DC/DC buck converter 30 having a bypass function.

The motor-alternator 10 can operate as a starter motor for starting an engine and as an alternator for generating electricity. The motor-alternator 10, as a starter motor, receives drive power through the inverter 11 to assist the power of the engine and as an alternator, supplies electrical energy generated during braking to the electrical energy storage 20.

The inverter 11 controls the electrical energy flow to and from the motor-alternator 10. That is, the inverter 11 converts the electrical energy supplied from the electrical energy storage 20 and supplies the converted electrical energy to the motor-alternator 10 or converts electrical energy generated by the motor-alternator 10 and supplies the converted electrical energy to the electrical energy storage 20.

In certain embodiments, the electrical energy storage 20 is implemented by a supercapacitor module including a plurality of supercapacitors to store the electrical energy recovered during regenerative braking by the motor-alternator 10 and supply the electrical energy to the motor-alternator 10 during vehicle acceleration to assist the engine torque.

In the present invention, the bypass function simply means that a high voltage power terminal A and a low voltage power terminal B (or the motor-alternator 10 and a vehicle electrical load 50) are physically and directly connected to each other such that they are electrically connected using a switching element such as a relay or FET. Therefore, during the bypass function, the unidirectional DC/DC buck converter 30 does not use the buck conversion function but physically and directly connects the high voltage power terminal A to the low voltage power terminal B.

As shown in FIG. 6, the high voltage power terminal A and the low voltage power terminal B are separated from each other with respect to the unidirectional DC/DC buck converter 30, in which the high voltage power terminal A represents the high voltage region where the motor-alternator 10 is driven and the low voltage power terminal B represents the low voltage region where the vehicle electrical load 50 is driven to consume the electricity.

In other words, in order to provide the bypass function to the unidirectional DC/DC buck converter 30, the unidirectional DC/DC buck converter 30 includes a bypass means such as a relay or FET which physically and directly connects the high voltage power terminal A to the low voltage power terminal B or the motor-alternator 10 and the vehicle electrical load 50 to obtain the electrical connection without buck or boost conversion. In the bypass state, the high voltage power terminal A and the low voltage power terminal B are electrically connected to each other by the relay or the like to provide a bidirectional flow of electricity.

Since the mild hybrid system of the present invention is configured with the unidirectional DC/DC buck converter 30 having a low capacitor instead of the existing bidirectional DC/DC converter having a high capacitor, the present invention has the advantages that manufacturing cost can be reduced, packaging process can be simplified due to a reduction in size, and an additional cooling device is not required due to a reduction in the amount of heat generated during buck conversion.

Next, operation of mild hybrid systems according to exemplary embodiments of the present invention will be described.

Figure 7:
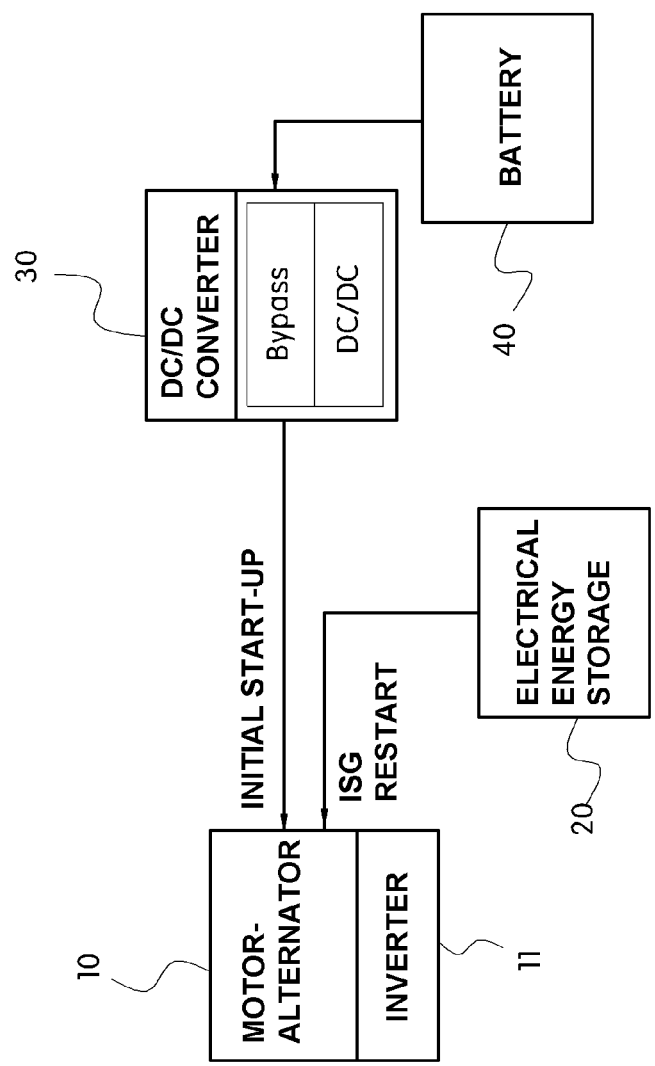
FIG. 7 is a schematic diagram showing a power transmission path during initial start-up and ISG restart-up of a mild hybrid system in accordance with an exemplary embodiment of the present invention.
Figure 8:
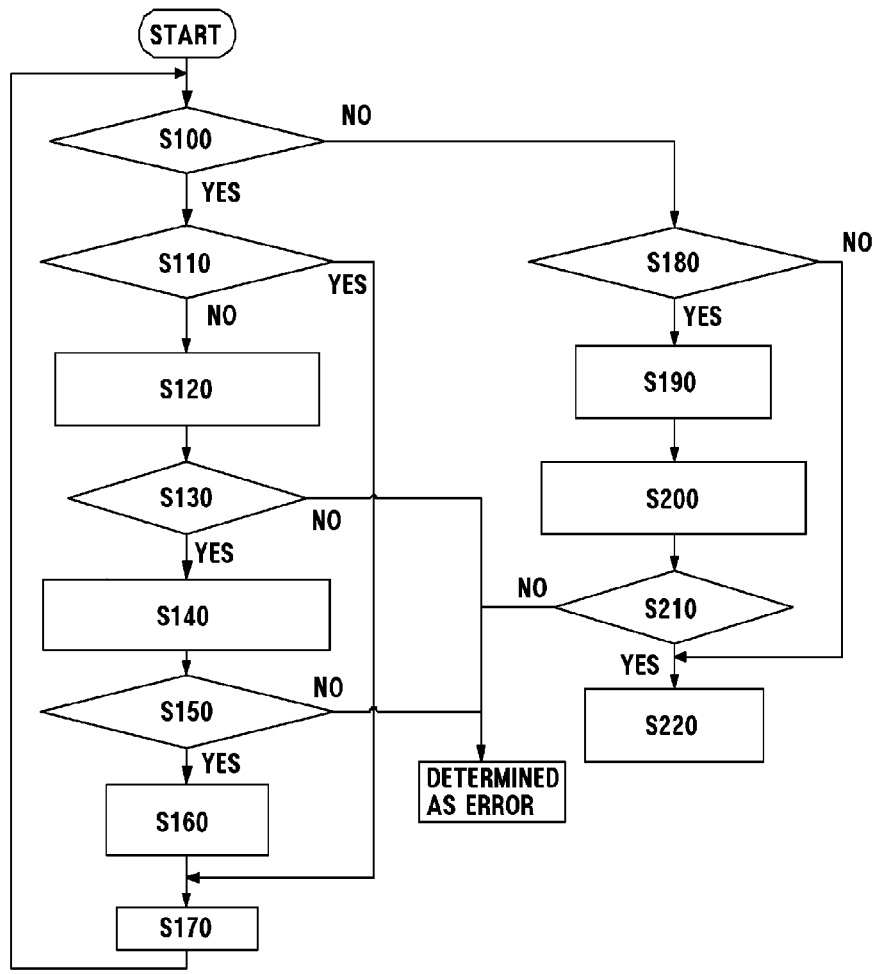
FIG. 8 is a flowchart illustrating a method for controlling the mild hybrid system in accordance with an exemplary embodiment of the present invention.

FIG. 7 is a schematic diagram showing a power transmission path during initial start-up and ISG restart-up of a mild hybrid system in accordance with an exemplary embodiment of the present invention, and FIG. 8 is a flowchart illustrating a method for controlling the mild hybrid system in accordance with an exemplary embodiment of the present invention.

In the present invention, the reference electrical load means an electrical load level at which improvement in fuel efficiency can be achieved using a certain level of electrical energy produced by regenerative braking. The unidirectional DC/DC buck converter 30 performs the buck conversion at a level lower than the reference electrical load and performs the bypass function through the bypass means at a level higher than the reference electrical load.

The mild hybrid system in accordance with the present invention can use all of the hybrid control functions, such as ISG, regenerative braking, reducing the generation load of the motor-alternator 10 through the supercapacitor module, assisting the engine torque, etc., as shown in FIG. 5, when the vehicle uses the electrical load smaller than the reference electrical load, i.e., when the electrical load driven at present (hereinafter referred to as the "current electrical load") is smaller than the reference electrical load.

In more detail, when the charge voltage of the supercapacitor module as the electrical energy storage 20 is greater than the vehicle electrical load 50 being used at present during idle stop, the voltage charged in the supercapacitor is supplied to the vehicle electrical load 50 through the unidirectional DC/DC buck converter 30.

Moreover, the motor-alternator 10 converts the rotational kinetic energy of the wheels into electrical energy during vehicle braking and stores the electrical energy in the supercapacitor, and the electrical energy stored in the supercapacitor is supplied to the vehicle electrical load 50 during the normal operation of the vehicle such as during cruise or acceleration, which leads to a reduction in the generation load of the motor-alternator 10, thereby improving the fuel efficiency.

Further, during vehicle acceleration, the supercapacitor module operates the motor-alternator 10 with the stored electrical energy to assist the engine torque, which results in fuel efficiency improvement, and supplies the electrical energy to the vehicle electrical load 50 to be operated.

Meanwhile, when the vehicle uses the electrical load greater than the reference electrical load, the high voltage power terminal A and the low voltage power terminal B are physically and directly connected to each other using the bypass means of the unidirectional DC/DC buck converter 30 as shown in FIG. 6.

Since the voltage level of the vehicle electrical load 50 is about 14 V, the motor-alternator 10 should be operated such that the generation voltage is within 14.7 V for a stable operation.

When the engine is initially started using the ignition key, the battery 40 and the motor-alternator 10 are physically and directly connected to each other in the bypass state of the unidirectional DC/DC buck converter 30 according to the operation of the bypass means, as shown in FIG. 6, thus preventing the failure of engine start due to the discharge of the supercapacitor module.

Since the electrical energy storage 20 stores a sufficient amount of electrical energy generated by the motor-alternator 10 while entering the idle stop during running, it is possible to restart the engine in ISG mode during running with the sufficient amount of electrical energy stored in the electrical energy storage 20. Therefore, the motor-alternator 10 receives the electrical energy from the electrical energy storage 20 to restart the engine.

As such, according to the present invention, it is possible to ensure the initial start-up performance by supplying the electrical energy to the motor-alternator 10 using the battery 40 during the initial start-up, and thereby it is possible to eliminate the existing starter system and thereby reduce the cost.

The method for controlling the above-described mild hybrid system in accordance with the present invention will be described with reference to FIG. 8.

First, it is determined whether the current electrical load is greater than the reference electrical load (S100).

If the current electrical load is greater than the reference electrical load, it is determined whether the unidirectional DC/DC buck converter 30 is in the bypass state (S110).

If it is determined that the unidirectional DC/DC buck converter 30 is in the bypass state, it is determined again whether the current electrical load is greater than the reference electrical load (S100) after a predetermined period of time (S170).

If it, on the other hand, is determined that the unidirectional DC/DC buck converter 30 is not in the bypass state, a controller (not shown) electrically or mechanically disconnects the supercapacitor module as the electrical energy storage 20 from the high voltage power terminal A (or motor-alternator 10) so as to perform the bypass function (S120).

When the supercapacitor module is disconnected from the high voltage power terminal A (or motor-alternator 10) (S130), the controller controls the motor-alternator 10 to reduce the generation voltage of the motor-alternator 10 to about 14 V corresponding to the voltage level of the reference electrical load (S140).

When the generation voltage of the motor-alternator 10 is reduced to about 14 V (S150), the unidirectional DC/DC buck converter 30 operates as the bypass means in response to a control signal of the controller (S160).

When the unidirectional DC/DC buck converter 30 is in the bypass state by the operation of the bypass means, the high voltage power terminal A and the low voltage power terminal B are physically and directly connected to each other, and the motor-alternator 10 and the vehicle electrical load 50 are directly connected to each other such that the generation voltage of the motor-alternator 10 is directly supplied to the vehicle electrical load 50, thus enabling the vehicle electrical load 50 to be driven.

Meanwhile, when the current electrical load is smaller than the reference electrical load, it is determined whether the unidirectional DC/DC buck converter 30 is in the bypass state (S180).

If it is determined that the unidirectional DC/DC buck converter 30 is not in the bypass state, the mild hybrid system performs all of the existing hybrid control functions, such as ISG, regenerative braking, reducing the generation load of the motor-alternator 10, assisting the engine torque, etc., according to the vehicle speed as shown in FIG. 5 (S220).

On the contrary, if it is determined that the unidirectional DC/DC buck converter 30 is in the bypass state, the unidirectional DC/DC buck converter 30 is configured to be converted into the buck conversion state in response to a control signal of the controller (S190) such that the supercapacitor module can cope with the vehicle electrical load 50.

While the unidirectional DC/DC buck converter 30 is in the buck conversion state, the supercapacitor module is connected to the high voltage power terminal A (or motor-alternator 10) in response to a control signal of the controller (S200) to allow the electrical energy to flow between the motor-alternator 10 and the supercapacitor module according to the vehicle speed.

If it is determined that the supercapacitor module is connected to the high voltage power terminal A (or motor-alternator 10) (S210), the mild hybrid system performs all of the existing hybrid control functions according to the vehicle speed (S220).

The above-described method for controlling the mild hybrid system is performed in response to the control signals of the controller, and the controller may include the inverter 11.

As described above, the present invention provides the effects including the following. Since the mild hybrid system of the present invention is configured with the unidirectional DC/DC buck converter having a low capacitor instead of the existing bidirectional DC/DC converter having a high capacitor, the manufacturing cost can be reduced, packaging size can be reduced, and an additional cooling device is not required due to a reduction in the amount of heat generated during buck conversion. Moreover, since the electrical energy is supplied to the motor-alternator using the battery during the initial start-up, it is possible to ensure the initial start-up performance, and thereby it is possible to eliminate the existing starter system and reduce the cost.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A mild hybrid system comprising:
   a motor-alternator;
   an inverter for controlling electrical energy flow to and from the motor-alternator;
   an electrical energy storage for storing electrical energy generated by the motor-alternator;
   a unidirectional DC/DC buck converter including a bypass means physically and directly connected between the motor-alternator and a vehicle electrical load so as to be electrically connected to each other so that the unidirectional DC/DC buck converter performs buck conversion at a level lower than a reference electrical load and performs a bypass function through the bypass means at a level higher than the reference electrical load, and
   a battery physically connected to the motor-alternator by the bypass means of the unidirectional DC/DC buck converter to provide additional voltage and/or power to the motor-alternator.

* * * * *